United States Patent Office 3,634,508
Patented Jan. 11, 1972

3,634,508
PHENYLACETYLGUANIDINES
John B. Bream, Redbourn, and Claude W. Picard, Welwyn Garden City, England, assignors to Dr. A. Wander SA, Bern, Switzerland
No Drawing. Filed Feb. 9, 1970, Ser. No. 9,973
Claims priority, application Switzerland, Feb. 20, 1969, 2,575/69; Mar. 27, 1969, 4,691/69; Nov. 7, 1969, 16,575/69
Int. Cl. C07c *103/22, 103/30*
U.S. Cl. 260—558 R     8 Claims

ABSTRACT OF THE DISCLOSURE

The invention concerns a compound of formula:

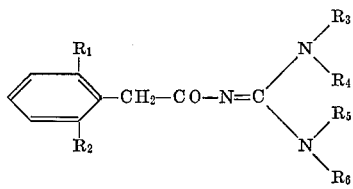

in which
$R_1$ signifies hydrogen, chlorine or methyl, and
$R_2$ signifies chlorine or methyl, and
either each of $R_3$, $R_4$, $R_5$ and $R_6$, which may be identical or different, signifies hydrogen, or an alkyl, hydroxyalkyl or alkoxyalkyl radical containing up to 6 carbon atoms, with the proviso that at least one of the radicals $R_3$, $R_4$, $R_5$ and $R_6$ is other than hydrogen, or $R_4$ and $R_5$ together form a dimethylene or trimethylene chain, and each of $R_3$ and $R_6$ signifies hydrogen.

and pharmaceutically acceptable acid addition salts thereof.

The compounds are useful in the treatment of hypertonia.

---

This invention relates to acetyl guanidine derivatives.
The invention provides compounds of Formula I,

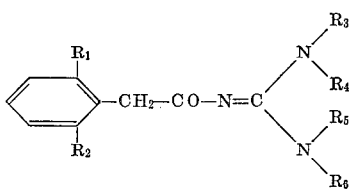

in which
$R_1$ signifies hydrogen, chlorine or methyl, and
$R_2$ signifies chlorine or methyl, and
either each of $R_3$, $R_4$, $R_5$ and $R_6$, which may be identical or different, signifies hydrogen, or an alkyl, hydroxyalkyl or alkoxyalkyl radical containing up to 6 carbon atoms, with the proviso that at least one of the radicals $R_3$, $R_4$, $R_5$ and $R_6$ is other than hydrogen, or $R_4$ and $R_5$ together form a dimethylene or trimethylene chain, and each of $R_3$ and $R_6$ signifies hydrogen.

In accordance with the invention, the compounds may be obtained by a process characterized by
(i) Obtaining a compound of Formula I by reacting a compound of Formula II,

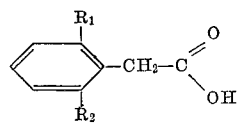

in which $R_1$ and $R_2$ have the above significance, or a reactive functional acid derivative of a compound of Formula II, with a compound of Formula III,

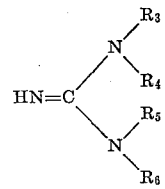

in which
$R_3$, $R_4$, $R_5$ and $R_6$ have the above significance, with the proviso that at least one of the radicals $R_3$ to $R_6$ is other than hydrogen,
(ii) Obtaining a compound of Formula Ia,

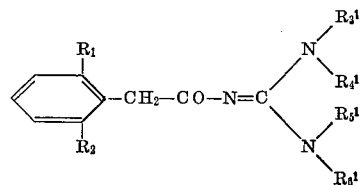

in which
$R_1$ and $R_2$ are as defined above, and
$R_3'$, $R_4'$, $R_5'$ and $R_6'$, which may be identical or different, each signifies hydrogen or an alkyl, hydroxyalkyl or alkoxyalkyl radical containing up to 6 carbon atoms, with the proviso that at least one of $R_3'$, $R_4'$, $R_5'$ and $R_6'$ is other than hydrogen,
by reacting a compound of Formula IV,

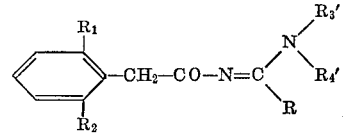

in which
$R_1$, $R_2$, $R_3'$ and $R_4'$ have the above significance, and
R signifies a reactive group capable of being split off with a hydrogen atom from ammonia or an amine,
with ammonia or an amine of formula $R_5'R_6'NH$, in which $R_5'$ and $R_6'$ are as defined above, at least one of the radicals $R_3'$ to $R_6'$ of the compounds participating in the reaction signifying other than hydrogen, or
(iii) Obtaining a compound of Formula Ib,

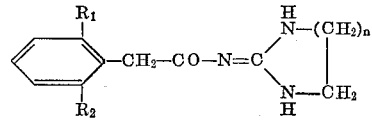

in which
$R_1$ and $R_2$ have the above significance, and
$n$ signifies 1 or 2,
either
(a) by reducing a compound of Formula V,

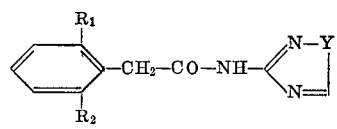

in which
$R_1$ and $R_2$ have the above significance, and
Y signifies a —$CH_2$— or —CH=CH— group, or (b) by reacting a compound of Formula IV with a diamine of Formula $H_2N—(CH_2)_n—CH_2—NH_2$, in which $n$ has the above significance.

In method (i) the reaction may be effected in an inert organic solvent, e.g. isopropanol or toluene, or without solvent. A suitable temperature is from room temperature (20–25° C.) to the reflux temperature, preferably room temperature to 80° C. Suitable reactive functional acid derivatives of compounds of Formula II include halides, especially chlorides or bromides, or lower alkyl esters. When a halide is used, and it is desired to obtain the free base form of the compound of Formula I, the reaction must be effected in the presence of an acid-binding agent, for example triethylamine, or using at least a 100% excess of the compound of Formula III. The progress of the reaction may be followed by, for example, establishing the degree of conversion of the starting material by thin layer chromatography.

In method (ii) suitable reactive groups R in the compounds IV include lower alkoxy or alkylmercapto groups, e.g. methoxy or methylthio, and aralkylthio groups, which may optionally be activated by substituents, e.g. p-nitrobenzylthio. The reaction is suitably carried out in the presence of an inert organic solvent, e.g. isopropanol. When ammonia is used, it is suitably in the form of an aqueous, concentrated solution. A preferred procedure involves dissolving the compound IV in an inert organic solvent and adding such ammonia solution or the amine thereto. The reaction is suitably carried out at a temperature from room temperature to reflux temperature. Stirring is normally advantageous. Typical reaction times range from 1 to 10 hours.

The reduction of compounds of Formula V in method (iii)(a) may, for example, be effected by the action of hydrogen in the presence of a suitable catalyst, e.g. a noble metal catalyst, especially an Adams catalyst. For this purpose the starting materials of Formula V may be dissolved in a suitable organic solvent such as ethanol, and hydrogenation effected with hydrogen at room temperature or with slight heating and at normal pressure, suitably until the theoretical amount of hydrogen is taken up.

The reaction of a compound of Formula IV with the diamine indicated in method (iii)(b) may be effected in a manner analogous to the process described in method (ii). Analogous considerations also apply to the reactive group R.

The resulting compounds of Formula I may be isolated in manner known per se, e.g. by extraction, precipitation or salt formation, and may subsequently be purified in manner known per se, e.g. by recrystallization.

Conversion of base forms of compounds of Formula I into acid addition salt forms, and acid addition salt forms into base forms, may be carried out in conventional manner.

The compounds of Formula II used as starting materials as well as their reactive derivatives are known or may be produced from known starting materials by methods known per se.

The compounds of Formula III used as starting materials are also known or may be produced from known starting materials in manner known per se.

The compounds of Formula IV, in which R signifies a lower alkoxy or alkylthio group, or an aralkylthio group which may optionally be substittued, used as starting materials, may be obtained by reacting halides, especially choliridesdfthetth3_ETAOIN ETAO IETAO INI I IN chlorides or bromides, of compounds of Formula II, with compounds of Formulae VI, VII or VIII,

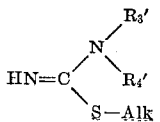
VI

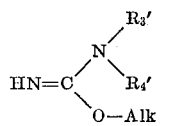
VII

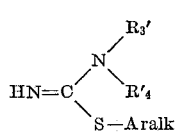
VIII in which formulae

Alk signifies a lower alkyl radical, and
Aralk signifies an optionally substituted aralkyl radical, e.g. the p-nitrobenzyl radical, and
$R_3'$ and $R_4'$ have the above significance.

The considerations involved and suitable reaction conditions will be clear to one skilled in the art, particularly after reference to the methods described for preparing Compounds I and the following examples.

Those compounds of Formula IV, in which the radical R signifies other than a lower alkoxy, an alkylmercapto or an optionally substituted aralkylthio group, may be produced in analogous manner.

The starting materials of Formula V, in which Y signifies a —$CH_2$— group, may be obtained by reacting compounds of Formula II or their reactive derivatives with 2-aminoimidazole, and compounds of Formula V, in which Y signifies a —CH=CH— group, may be obtained by reacting compounds of Formula II or their reactive derivatives with 2-aminopyrimidine. The considerations involved and suitable reaction conditions will be clear to one skilled in the art, particularly after reference to the following examples and the methods described for Compounds I.

The compounds of Formula I are useful because they possess pharmacological activity in animals. In particular the compounds are useful in the treatment of hypertonia in general and particularly in the treatment of essential and renal hypertonia, as indicated by a lowering of the blood pressure upon oral or intravenous administration of the compounds in experimentally hypertonic rats (see F. Gross, P. Loustalot and F. Sulser, Arch. exper. Path. Pharmakol. 229, 381–388, 1956).

The following compounds of the invention have been found to have particularly interesting activity:

2-[2-(2,6-dichlorophenyl)-acetylimino]-imidazolidine,
2-[2-(2,6-dichlorophenyl)-acetylimino]-hexahydropyrimidine,
2-[2-(2,6-dichlorophenyl)-acetyl]-1-methyl guanidine,
2-[2-(2,6-dichlorophenyl)-acetyl]-1-ethyl guanidine,
2-[2-(2,6-dichlorophenyl)-acetyl]-1-propyl guanidine,
2-[2-(2,6-dichlorophenyl)-acetyl]-1-isopropyl guanidine,
2-[2-(2,6-dichlorophenyl)-acetyl]-1,1-dimethyl guanidine,
2-[2-(2,6-dichlorophenyl)-acetyl]-1,3-dimethyl guanidine, and
2-[2-(2,6-dichlorophenyl)-acetyl]-1-(3-hydroxypropyl)-guanidine.

For the above-mentioned use the dosage administered will, of course, vary depending on the compound employed, mode of administration and treatment desired. However, in general, satisfactory results are obtained when administered at a daily dosage of from 0.05 to 10 mg./kg. of animal body weight, preferably administered in divided doses 2 to 4 times daily, or in sustained release form. For most larger mammals the daily dose is in the range of from 5 to 20 mg., and dosage forms suitable for oral administration comprise from about 1 to 10 mg. of the compound admixed with a solid or liquid pharmaceutical diluent or carrier.

The compounds of Formula I may be used as medicaments on their own or in the form of appropriate medicinal preparations for oral administration, e.g. in the form of tablets or dragées, or for parenteral administration, e.g. in the form of injectable solutions.

The compounds may also be used in the form of their pharmaceutically acceptable acid addition salts. Examples of suitable inorganic acids for such salt formation are hydrochloric, sulphuric, nitric and phosphoric acid, and examples of suitable organic acids are toluenesulphonic, acetic, malonic, succinic, malic, maleic and tartaric acid.

A preferred tablet composition consists of 10 mg. of compound of Formula I, e.g. 2-[2-(2,6-dichlorophenyl)-acetyl]-1-(3-hydroxypropyl)guanidine in hydrochloride form, 108 mg. of lactose, 2 mg. of paraffin oil, 1 mg. of gelatin, 13 mg. of maize starch and 6 mg. of talc. This tablet is desirably provided with a breaking slit.

In the following non-limitative examples all temperatures are uncorrected.

EXAMPLE 1

2-[2-(2,6-dichlorophenyl)-acetylimino]-imidazolidine

Sodium isopropanolate, produced from 3.45 g. of sodium and 200 cc. of isopropanol, in 200 cc. of isopropanol is added to a solution of 31.95 g. of 2-amino-2-imidazoline hydriodide in 300 cc. of isopropanol, whereupon 32.85 g. of 2,6-dichlorophenyl acetic acid methyl ester are added with stirring. The reaction mixture is allowed to stand at room temperature for 72 hours and is subsequently concentrated by evaporation. The residue is treated twice with 100 cc. of isopropanol and the solution is each time concentrated by evaporation in a vacuum. The residue is dissolved in water and the aqueous solution is washed with ether and sodium hydroxide is added thereto. The precipitated base is filtered with suction, washed with water and dried over phosphorus pentoxide. 2-[2-(2,6-dichlorophenyl)-acetylimino]-imidazolidine in free base form is obtained in the form of a white powder having a M.P. of 235–236° C. The hydrochloride form has a M.P. of 265–267° C.

EXAMPLE 2

2-[2-(2,6-dichlorophenyl)-acetylimino]-hexahydropyrimidine

A solution of 21.9 g. of 2,6-dichlorophenyl acetic acid methyl ester in 100 cc. of isopropanol is added with stirring to a solution of 11.9 g. of 2-amino-1,4,5,6-tetrahydropyrimidine in 200 cc. of isopropanol. The reaction mixture is allowed to stand overnight, whereupon it is concentrated by evaporation in a vacuum, the residue is taken up several times in isopropanol and the solution is each time concentrated by evaporation in a vacuum. The resulting residue is washed with ether, crystallized from methanol/ether containing 0.15 mol of hydrochloric acid and recrystallized from methanol. 2-[2-(2,6-dichlorophenyl)-acetylimino]-hexahydropyrimidine in hydrochloride form is obtained in the form of white needles having a M.P. of 285–287° C.

EXAMPLE 3

2-[2-(2,6-dichlorophenyl)-acetyl]-1-methyl guanidine 32.9 g. of 2,6-dichlorophenyl acetic acid methyl ester are added to a solution of methyl guanidine in isopropanol (produced by reacting 0.075 mol of methyl guanidine sulphate with 0.15 mol of sodium isopropanolate in 250 cc. of isopropanol), and the reaction mixture is allowed to stand at room temperature for 4 days. After concentrating the reaction mixture by evaporation the residue is taken up 4 times in 150 cc. of isopropanol and the solution is each time concentrated by evaporation in a vacuum. The resulting residue is dissolved in ethanol and the solution is acidified to pH 3 with hydrochloric acid in ethanol. A small amount of insoluble material is filtered off from the resulting solution, a small amount of water is added to the filtrate and the resulting precipitate is filtered off, crystallized from ethanol and recrystallized from water. 2-[2-(2,6-dichlorophenyl)-acetyl]-1-methyl guanidine in hydrochloride form is obtained in the form of white needles having a M.P. of 254–256° C.

EXAMPLE 4

2-[2-(2,6-dichlorophenyl)-acetyl]-1,1-dimethyl guanidine 13.6 g. of finely pulverized 1,1-dimethyl guanidine sulphate are added to a solution of sodium isopropanolate in isopropanol (produced by dissolving 2.3 g. of sodium in 200 cc. of isopropanol), whereupon 21.9 g. of 2,6-dichlorophenyl acetic acid methyl ester are added. The reaction mixture is stirred overnight and is then filtered in order to remove the precipitated sodium sulphate. The filtrate is heated on a steam bath and is then allowed to stand at room temperature for 65 hours. The reaction mixture is evaporated to dryness in a vacuum, the residue is dissolved in isopropanol and the solution is acidified by the dropwise addition of sulfuric acid. A small amount of precipitate is filtered off, whereupon the filtrate is cooled to 0° C. The resulting precipitate is filtered with suction and crystallized twice from ethanol/ether 2-[2-(2,6-dichlorophenyl)-acetyl]-1,1-dimethyl guanidine in sulphate form is obtained in the form of small white plates having a M.P. of 201–204° C. (decomp.).

EXAMPLE 5

2-[2-(2,6-dichlorophenyl)-acetyl]-1,1,3,3-tetramethyl guanidine

A solution of 11.15 g. of 2,6-dichlorophenyl acetic acid chloride in 50 cc. of toluene is added with stirring to a solution of 11.5 g. of 1,1,3,3-tetramethyl guanidine in 50 cc. of toluene, whereup the reaction mixture is heated to 50–60° C. for 1½ hours. After cooling the reaction mixture is filtered in order to remove the resulting 1,1,3,3-tetramethyl guanidine hydrochloride. The filtrate is acidified with a solution of 4.9 g. of sulphuric acid in 75 cc. of isopropanol. The resulting suspension is allowed to stand overnight and is filtered. The filter residue is washed with ether and crystallized from ethanol/isopropanol. 2 - [2 - (2,6-dichlorophenyl)-acetyl]-1,1,3,3-tetramethyl guanidine in sulphate form is obtained in the form of large prismatic needles having a M.P. of 173–175° C.

EXAMPLE 6

2-[2-(2,6-dichlorophenyl)-acetyl]-1-ethyl guanidine

A solution of 0.11 mol of sodium isopropanolate in 300 cc. of isopropanol is poured into a warm solution of 16.5 g. of ethyl guanidine nitrate in 100 cc. of isopropanol, and the reaction mixture is allowed to stand for half an hour. The precipitated sodium nitrate is filtered off and 21.9 g. of 2,6-dichlorophenyl acetic acid methyl ester are added to the filtrate and this is allowed to stand for seven days. During this period the resulting methanol is distilled off periodically with some isopropanol, and isopropanol is again added each time. After concentrating the reaction mixture almost completely by evaporation, the resulting thick syrup, which contains some needles, is suspended in dry ether, and the suspension is acidified to pH 3 with hydrochloric acid in ethanol. The precipitated solid substance is filtered off, washed with ether and treated with hot ethanol. The resulting white powder is crystallized from aqueous isopropanol, whereby 2-[2-(2,6-dichlorophenyl)-acetyl]-1-ethyl guanidine in hydrochloride form is obtained in the form of clogged up needles having a M.P. of 228–231° C.

EXAMPLE 7

2-[2-(2-chlorophenyl)-acetylimino] imidazolidine

A suspension of 13.4 g. of 2-amino-2-imidazoline sulphate in 100 cc. of absolute ethanol containing 0.1 mol of sodium alcoholate is stirred at room temperature for 1 hour, and a solution of 18.5 g. of 2-chlorophenyl acetic acid methyl ester in 50 cc. of absolute ethanol is then added. The reaction mixture is stirred for 18 hours, is filtered and the filtrate is evaporated to dryness. The resulting rubber-like residue is triturated with ether and yields a slightly yellowish solid substance, which is suspended in hot isopropanol. The suspension is acidified with 25% hydrochloric acid in ethanol, is treated with charcoal, filtered and diluted with ether. The resulting white needles are separated and recrystallized from aqueous ethanol, whereby 2 - [2 - (2-chlorophenyl)-acetylimino]-imidazolidine in hydrochloride form having a M.P. of 238–240° C. (decomp.) is obtained.

EXAMPLE 8

2-[2-(2,6-dichlorophenyl)-acetyl]-1-isopropyl guanidine

A solution of 18.2 g. of isopropyl guanidine nitrate in 75 cc. of isopropanol is added to a warm solution of 0.11 mol of sodium isopropanolate in 200 cc. of isopropanol. The reaction mixture is allowed to stand for half an hour, whereupon the resulting sodium nitrate is filtered off, and 21.9 g. of 2,6-dichlorophenyl acetic acid methyl ester are added to the filtrate, and the mixture is allowed to stand at room temperature for 6 days. During this period the resulting methanol is distilled off periodically with a small amount of isopropanol, and isopropanol is again added each time. The reaction mixture is subsequently evaporated almost to dryness, is diluted with ether and acidified to pH 3 with hydrochloric acid in ethanol. The resulting white solid substance is filtered off and crystallized from ethanol/ether, whereby 2-[2-(2,6-dichlorophenyl)-acetyl]-1-isopropyl guanidine in hydrochloride form is obtained in the form of white prisms having a M.P. of 236–238° C.

EXAMPLE 9

2-[2-(2,6-dichlorophenyl)-acetyl]-1-propyl guanidine

A solution of 18.2 g. of propyl guanidine nitrate in 75 cc. of isopropanol is added to a warm solution of 0.11 mol of sodium isopropanolate in 200 cc. of isopropanol. The resulting, sodium nitrate is filtered off, and 21.9 g. of 2,6-dichlorophenyl acetic acid methyl ester are added to the filtrate, and the mixture is allowed to stand at room temperature for 7 days. During this period the resulting methanol is distilled off periodically with a small amount of isopropanol, and isopropanol is again added each time. The reaction mixture is subsequently evaporated to dryness and the residue triturated with ether and acidified to pH 3 with hydrochloric acid in ethanol. The resulting solid substance is separated and crystallized thrice from ether/isopropanol. 2 - [2-(2,6-dichlorophenyl)-acetyl]-1-propyl guanidine in hydrochloride form is obtained in the form of white needless having a M.P. of 224–225° C.

EXAMPLE 10

2-[2-(2,6-dimethylphenyl)-acetylimino]-imidazolidine 8.45 g. of dry, pulverized 2-amino-2-imidazoline sulphate are added to a solution of 0.063 mole of sodium ethylate in 150 cc. of absolute ethanol, and the reaction mixture is stirred at room temperature for 3 hours. The reaction mixture is subsequently filtered, and 11.2 g. of 2,6-dimethylphenyl acetic acid methyl ester are added to the filtrate, and the mixture is allowed to stand at room temperature for 96 hours. During this period the resulting methanol is periodically distilled off with ethanol and replaced by isopropanol. The base which crystallizes is filtered off, the filtrate is evaporated to dryness and the residue taken up in dilute hydrochloric acid. The hydrochloric acid solution is extracted with ether, and the aqueous phases are made alkaline with a dilute caustic soda solution, whereby further amounts of bases result. The combined bases are taken up twice in dilute hydrochloric acid and are again precipitated each time with caustic soda solution. 2-[2-(2,6-dimethylphenyl)-acetylimino]-imidazolidine in free base form is obtained in the form of a white powder having a M.P. of 205–206° C.

EXAMPLE 11

2-[2-(2,6-dichlorophenyl-acetyl]-1,3-dimethyl guanidine

A suspension of 24.7 g. of N,N′,S-trimethyl isothiouronium iodide in 100 cc. of isopropanol is treated with 20 cc. of a 20% aqueous ammonia solution and heated on a steam bath until methyl mercaptan evolution is complete. The reaction mixture is evaporated to dryness and dried with isopropanol by azeotropic distillation. 21.9 g. of 2,6-dichlorophenyl acetic acid methyl ester and a solution of 0.1 mol of sodium ethylate in 200 cc. of ethanol are added to the 1,3-dimethyl guanidine hydriodide solution, whereupon the reaction mixture is allowed to stand at room temperature for 14 days. During this period the resulting methanol is periodically distilled off with some ethanol and is each time replaced by isopropanol. After evaporating to dryness the residue is diluted with ether and acidified to pH 2 with hydrochloric acid in ethanol. The resulting precipitate is filtered off, dissolved in water and made alkaline with a dilute caustic soda solution. The precipitated bases are separated, suspended in water and dissolved by the addition of dilute hydrochloric acid and heating. The hot solution is treated with charcoal and filtered. Upon cooling the filtrate yields dull yellow needles which are recrystallized from water. 2-[2-(2,6-dichlorophenyl)-acetyl]-1,3-dimethyl guanidine in hydrochloride form, having a M.P. of 247–249° C., is obtained.

EXAMPLE 12

2-[2-(2,6-dichlorophenyl)-acetyl]-1,1,3-trimethyl guanidine

A solution of 14.1 g. of 2,6-dichlorophenyl acetic acid chloride in 30 cc. of toluene is added to a solution of 0.126 mol of 1,1,3-trimethyl guanidine in 200 cc. of toluene (produced by reacting 17.3 g. of 1,1,3-trimethyl guanidine hydrochloride with 0.126 mol of sodium ethylate in 250 cc. of absolute ethanol). The mixture is stirred for 5 hours, is allowed to stand for 24 hours, and the resulting precipitate is filtered off and freed from excess 1,1,3-trimethyl guanidine hydrochloride by treatment with water. The residue is acidified to pH 2 with dilute hydrochloric acid, and the solution is filtered in order to remove insoluble material. The filtrate is evaporated to dryness and the residue triturated with acetone. The resulting while solid substance is crystallized twice from a small amount of water, whereby 2-[2-(2,6-dichlorophenyl)-acetyl]-1,1,3-trimethyl guanidine in hydrochloride form is obtained in the form of a fine white power having M.P. of 214–216° C.

EXAMPLE 13

2-[2-(2,6-dichlorophenyl)-acetyl]-1-(3-hydroxypropyl)-guanidine

A solution of 0.1 mol of sodium ethylate in 150 cc. of absolute ethanol is added to a suspension of 18.0 g. of 3-hydroxypropyl guanidine nitrate in 100 cc. of absolute ethanol, and the mixture is stirred at 20° C. for 16 hours. The ethanol is removed by evaporation and replaced by isopropanol. The precipitated sodium nitrate is removed by filtration. 21.9 g. of 2,6-dichlorophenyl acetic acid methyl ester are added to the filtrate, and the reaction mixture is allowed to stand at room temperature for 14 days, and 20 cc. of a 25% solution of hydrochloric acid in ethanol are subsequently added. After removing some precipitated sodium chloride the filtrate is concentrated by evaporation in order to remove the isopropanol, and the resulting rubber-like residue is crystallized from isopropanol/ether and recrystallized from absolute ethanol/ether while treating with charcoal. 2-[2-(2,6-dichlorophenyl)-acetyl]-1-(3-hydroxypropyl)-guanidine in hydrochloride form is obtained in the form of small white plates having M.P. of 164–166° C.

EXAMPLE 14

2-[2-(2-chlorophenyl)-acetylimino]-hexahydropyrimidine 18.5 g. of 2-chlorophenyl acetic acid methylester are added to a solution of 0.1 mol of 2-amino-1,4,5,6-tetrahydropyrimidine in 200 cc. of isopropanol. The reaction mixture is subsequently allowed to stand at room temperature for 6 hours and is then concentrated by evaporation. The residue is suspended in ether and acidified to pH 3 with hydrochloric acid in ethanol. The white precipitate is separated and crystallized twice from water. 2-[2-(2-chlorophenyl)-acetylimino]-hexahydropyrimidine in hydrochloride form is obtained in the form of small white plates having M.P. of 233–235° C.

EXAMPLE 15

2-[2-(2,6-dichlorophenyl)-acetyl]-1-(3-methoxypropyl)-guanidine

A solution of 0.1 mol of sodium ethylate in 150 cc. of absolute ethanol is added to a suspension of 18.0 g. of 3-methoxypropyl guanidine sulphate in 100 cc. of absolute ethanol, and the mixture is stirred at 20° C. for 16 hours. 21.9 g. of 2,6-dichlorophenyl acetic acid methyl ester are subsequently added, and the reaction mixture is allowed to stand at 20° C. for 4 days. The ethanol is removed by evaporation in a vacuum and replaced by dry isopropanol. After the addition of 2.75 cc. of sulphuric acid in 30 cc. of isopropanol a solid substance is formed, which is dissolved by the addition of a small amount of water. The reaction mixture is subsequently concentrated by evaporation in a vacuum, and the resulting rubber-like residue is triturated with ether and yields a white solid material. This is triturated with a small amount of hot water and crystallized from water yielding 2-[2-(2,6-dichlorophenyl)-acetyl]-1-(3-methoxypropyl)-guanidine in sulphate form in the form of small white plates having M.P. of 182–185° C.

EXAMPLE 16

2-[2-(2,6-dichlorophenyl)-acetyl]-1-(2-methoxyethyl)-guanidine

A solution of 0.1 mol of sodium ethylate in 150 cc. of absolute ethanol is added to a suspension of 16.6 g. of 2-methoxyethyl guanidine sulphate in 100 cc. of absolute ethanol, and the mixture is stirred at 20° C. for 16 hours. The precipitated sodium sulphate is removed by centrifuging and filtration. 21.9 g. of 2,6-dichlorophenyl acetic acid methyl ester are added to the filtrate and the reaction mixture is allowed to stand at 20° C. for 4 days. The ethanol is removed by evaporation in a vacuum and replaced by dry isopropanol. 2.75 cc. of sulphuric acid in 30 cc. of isopropanol are added to the solution and this is diluted with ether. The precipitated solid substance is separated and triturated with a small amount of hot water and recrystallized from water. 2-[2-(2,6-dichlorophenyl)-acetyl]-1-(2-methoxyethyl)-guanidine in sulphate form is obtained in the form of a microcrystalline product having a M.P. of 179–180°C.

EXAMPLE 17

2-[2-(2,6-dichlorophenyl)-acetyl]-1-(2-hydroxyethyl)-guanidine

A solution of 0.1 mol of sodium ethylate in 150 cc. of absolute ethanol is added to a suspension of 15.2 g. of 2-hydroxyethyl guanidine sulphate in 100 cc. of absolute ethanol, and the mixture is stirred at 20° C. for 16 hours. The precipitated sodium sulphate is removed by centrifuging and filtration. 21.9 g. of 2,6-dichlorophenyl acetic acid methyl ester are added to the filtrate and the reaction mixture is allowed to stand at 20° C. for 4 days. The ethanol is removed by evaporation in a vacuum and is replaced by dry isopropanol. 2.75 cc. of sulphuric acid in 30 cc. of isopropanol are added to the solution, and the resulting precipitate is dissolved by the addition of a small amount of water and by heating on a steam bath. The solution is cooled to 0° C. and the resulting white solid substance is filtered off. After recrystallization from isopropanol/water and triturating the crystals with water 2-[2-(2,6-dichlorophenyl)-acetyl] - 1 - (2 - hydroxyethyl) guanidine in sulphate form is obtained in the form of a white microcrystalline product having M.P. of 178–180° C.

EXAMPLE 18

2-[2-(2,6-dichlorophenyl)-acetylimino]-hexahydropyrimidine 3 g. of 2(2,6-dichlorophenyl-acetamido)-pyrimidine in 400 cc. of absolute ethanol containing 0.005 mol of dry hydrogen chloride gas are hydrogenated in the presence of 0.5 g. of Adams catalyst at room temperature. After 15 minutes the taking up of hydrogen is completed and the catalyst is filtered off and the filtrate concentrated to about 20 cc. Upon cooling a white solid substance is formed, which is filtered off, washed with ether, dried at 70° C. and crystallized twice from methanol/ether. 2-[2-(2,6 - dichlorophenyl)-acetylimino]-hexahydropyrimidine in hydrochloride form is obtained in the form of white needles having a M.P. of 283–286° C. (decomp.), this product being identical with the product obtained in accordance with Example 2.

EXAMPLE 19

2-[2-(2,6-dichlorophenyl)-acetyl]-1-isobutyl guanidine

A solution of 64.3 g. of S-methyl isothiouronium chloride and 40.2 g. of isobutyl amine in 500 cc. of water is heated on a steam bath until methyl mercaptan evolution is complete. The reaction mixture is evaporated to dryness in a rotary evaporator, the residue is dried with isopropanol and toluene and taken up in 180 cc. of isopropanol.

45 cc. of this solution (equivalent to 0.125 mol of isobutyl guanidine hydrochloride) are treated with a solution of 0.125 mol of sodium ethylate in 50 cc. of ethanol, whereupon the precipitated sodium chloride is filtered off. 21.9 g. of 2,6-dichlorophenyl acetic acid methyl ester are added to the filtrate. The ethanol is subsequently distilled off in a vacuum and replaced by isopropanol. The mixture is allowed to stand at room temperature for 7 days, whereupon the solvent is distilled off in a vacuum and ether is added to the residue. The ether solution is acidified to pH 3 with hydrochloric acid in ethanol, the resulting precipitate is filtered off and washed with isopropanol and then with acetone. The washed residue is recrystallized from ethanol/water and yields 2-[2-(2,6-dichlorophenyl)-acetyl]-1-isobutyl guanidine in hydrochloride form having a M.P. of 236–238° C.

EXAMPLE 20

2-[2-(2,6-dichlorophenyl)-acetyl]-1-butyl guanidine

A solution of 64.3 g. of S-methyl isothiouronium chloride and 40.2 g. of n-butyl amine in 500 cc. of water is heated on a steam bath until methyl mercaptan evolution is complete. The reaction mixture is evaporated to dryness, the residue is dried with isopropanol and toluene and taken up in 180 cc. of isopropanol.

45 cc. of this solution (equivalent to 0.125 mol of n-butyl guanidine hydrochloride) are treated with a solution of 0.125 mol of sodium ethylate in 50 cc. of ethanol, whereupon the precipitated sodium chloride is filtered off. 21.9 g. of 2,6-dichlorophenyl acetic acid methyl ester are added to the filtrate. The ethanol is subsequently distilled off in a vacuum and replaced by isopropanol. The reaction mixture is allowed to stand at room temperature for 7 days, whereupon the solvent is distilled off in a vacuum and ether is added to the residue. The ether solution is acidified to pH 3 with hydrochloric acid in ethanol, the resulting precipitate is filtered off and washed with isopropanol and then with acetone. The washed residue is recrystallized from ethanol/water and yields 2-[2-(2,6-dichlorophenyl) - acetyl] - 1 - butyl guanidine in hydrochloride form having a M.P. of 208–209° C.

EXAMPLE 21

2-[2-(2,6-dichlorophenyl)-acetyl]-1,3-diethyl guanidine 25 cc. of concentrated aqueous ammonia solution are added portionwise with heating to a solution of 50 g. of S-methyl-N,N'-diethyl isothiouronium iodide in 100 cc. of ethanol. After methyl mercaptan evolution is complete the solvent is removed by evaporation and a solution of 0.182 mol of sodium ethylate in 30 cc. of ethanol is added to the resulting oil. The ethanol is removed by evaporation and replaced by toluene, whereupon the precipitated sodium iodide is filtered off. The filtrate containing 1,3-diethyl guanidine is stirred and a solution of 20.3 g. of 2,6-dichlorophenyl acetic acid chloride is added dropwise. The reaction mixture is subsequently stirred at room temperature for 48 hours, is diluted with isopropanol and acidified to pH 3 with hydrochloric acid in ethanol. The precipitated diethyl guanidine hydrochloride is filtered off, the resulting filtrate is evaporated to dryness and the residue suspended in water and extracted with ether. After treatment with active charcoal the aqueous phase is made alkaline with 20% caustic soda solution and the precipitated base is filtered off. The resulting crude base is suspended in water and acidified with hydrochloric acid. The resulting white needles are recrystallized from water with active charcoal treatment, whereby 2-[2-(2,6-dichlorophenyl)-acetyl]-1,3-diethyl guanidine in hydrochloride form, having a M.P. of 200–202° C., is obtained.

EXAMPLE 22

2-[2-(2,6-dichlorophenyl)-acetyl]-1-(2-hydroxypropyl)-guanidine

A solution of 7.5 g. of isopropanol amine in 20 cc. of ethanol is added dropwise to a hot solution of 12.85 g. of S-methyl isothiouronium chloride in 100 cc. of water. After methyl mercaptan evolution is complete the reaction mixture is concentrated by evaporation and the residue dried with isopropanol by repeated azeotropic distillation. The isopropanol solution is treated with 0.1 of sodium ethylate in 40 cc. of ethanol and the precipitated salt is filtered off. 21.9 g. of 2,6-dichlorophenyl acetic acid methyl ester are added to the filtrate containing 2-hydroxypropylguanidine, whereupon the solvents are removed by evaporation and replaced by isopropanol. The methanol formed upon allowing the reaction mixture to stand is periodically removed with isopropanol by azeotropic distillation. When no further methanol is formed the reaction mixture is acidified with hydrochloric acid in ethanol and the precipitated rubber-like product is filtered off and taken up in water. The aqueous solution is first extracted with ether and then treated with active charcoal and filtered. The filtrate is concentrated by evaporation and the residue treated with actone, whereby 2-[2-(2,6 - dichlorophenyl) - acetyl] - 1-(2-hydroxypropyl)-guanidine in hydrochloride form is obtained in the form of white needles having a M.P. of 178–180° C.

EXAMPLE 23

2-[2-(2,6-dichlorophenyl)-acetylimino]-imidazolidine 2.8 g. of S-methyl-N-(2,6 - dichlorophenyl-acetyl) - isothiourea are added to 0.6 g. of ethylene diamine, whereby the mixture warms slightly and methyl mercaptan escapes. The solid substance obtained after cooling the reaction mixture is separated, is stirred with 20 cc. of ethylene diamine, filtered off, washed with water and taken up in 100 cc. of dilute hydrochloric acid. The hydrochloric acid suspension is filtered in order to remove starting material and the filtrate is made alkaline with dilute caustic soda solution. The precipitated base is separated, washed and treated with isopropanol, whereby 2-[2-(2,6-dichlorophenyl)-acetylimino] - imidazolidine is obtained in the form of a white powder having a M.P. of 234–237° C., this product being identical with the product obtained in accordance with Example 1.

The starting material used in this example may be obtained as follows:

A solution of 5.6 g. of 2,6-dichlorophenyl acetic acid chloride in 10 cc. of acetone is slowly added to a solution of 4.7 g. of S-methyl isothiourea in 120 cc. of acetone. The precipitated S-methyl isothiouronium chloride is filtered off and the filtrate concentrated by evaporation. The residue is crystallized twice from diisopropyl ether, whereby S-methyl-N-(2,6-dichlorophenyl-acetyl) - isothiourea is obtained in the form of white rhombic crystals having a M.P. of 125–127° C.

EXAMPLE 24

2-[2-(2,6-dichlorophenyl)-acetyl]-1-methyl guanidine

A solution of 1.3 g. of S-methyl-N-(2,6-dichlorophenyl-acetyl)-isothiourea in 100 cc. of ethanol is treated with dry methyl amine gas at room temperature. The saturated solution is evaporated to dryness, the residue dissolved in a small amount of ethanol and the solution acidified to pH 2 with hydrochloric acid in ethanol. The resulting mixture is diluted with ether, the precipitated crystalline product separated and crystallized from hot isopropanol. 2-[2-(2,6-dichlorophenyl)acetyl] - 1 - methyl guanidine in in hydrochloride form is obtained in the form of a white powder having a M.P. of 248–252° C., this product being identical with the product obtained in Example 3.

EXAMPLE 25

2-[2-(2,6-dichlorophenyl)-acetyl]-1-(4-hydroxybutyl)-guanidine 11.0 g. of S-methyl-N-(2,6-dichlorophenyl-acetyl)-isothiourea are dissolved in 120 cc. of isopropanol and 3.5 g. of 4-hydroxybutyl amine are added. The reaction mixture is heated under reflux and stirred for 6 hours, is allowed to cool overnight, hydrochloric acid in ethanol is added and the reaction mixture is then concentrated by evaporation. The residue is divided between water and ether and the aqueous phase is concentrated by evaporation. The residue is triturated with acetone and crystallized from isopropanol/diisopropyl ether, whereby 2-[2-(2,6-dichlorophenyl)-acetyl]-1-(4-hydroxybutyl) - guanidine in hydrochloride form, having a M.P. of 158–160° C., is obtained.

EXAMPLE 26

2-[2-(2,6-dichlorophenyl)-acetyl]-1-(6-hydroxyhexyl)-guanidine 3 g. of S-methyl-N-(2,6-dichlorophenyl-acetyl)-isothiourea are dissolved in 120 cc. of isopropanol and 1.5 g. of 6-amino-1-hexanol are added. The reaction mixture is heated under reflux for 2.5 hours, is allowed to cool overnight and is concentrated by evaporation. The residue is treated with hydrochloric acid in ethanol and is again concentrated by evaporation. The residue is divided between toluene and water and the aqueous phase is concentrated by evaporation. The residue is treated with isopropanol and crystallized from isopropanol/diisopropyl ether, whereby 2-[2-(2,6-dichlorophenyl)-acetyl] - 1 - (6-hydroxyhexyl)-guanidine in hydrochloride form, having a M.P. of 152–153° C., is obtained.

EXAMPLE 27

2-[2-(2,6-dichlorophenyl)-acetyl]-1-(5-hydroxypentyl)-guanidine 5.5 g. of S-methyl-N-(2,6-dichlorophenyl-acetyl)-isothiourea and 2.1 g. of 5-amino-1-pentanol are dissolved in 200 cc. of isopropanol and the solution is heated under reflux for 6 hours. The reaction mixture is left to cool overnight, a solution of hydrochloric acid in ethanol is then added and the solution is concentrated by evaporation. The residue is divided between water and toluene and the aqueous phase is concentrated by evaporation. The residue is treated with isopropanol and crystallized thrice from isopropanol, whereby 2-[2-(2,6-dichloropheny)-acetyl]-1-(5-hydroxypentyl)-guanidine in hydrochloride form, having a M.P. of 183–185° C., is obtained.

What is claimed is:

1. A compound of formula:

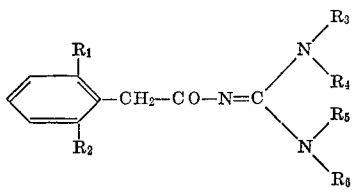

in which $R_1$ signifies hydrogen, chlorine or methyl, and
$R_2$ signifies chlorine or methyl, and
each of $R_3$, $R_4$, $R_5$ and $R_6$, which may be identical or different, signifies hydrogen, or an alkyl, hydroxyalkyl or alkoxyalkyl radical containing up to 6 carbon atoms, with the proviso that at least one of the radicals $R_3$, $R_4$, $R_5$ and $R_6$ is other than hydrogen, and pharmaceutically acceptable acid addition salts thereof.

2. The compound of claim 1, which is 2-[2-(2,6-dichlorophenyl)-acetyl]-1-methyl guanidine.

3. The compound of claim 1, which is 2-[2-(2,6-dichlorophenyl)-acetyl]-1-ethyl guanidine.

4. The compound of claim 1, which is 2-[2-(2,6-dichlorophenyl)-acetyl]-1-propyl guanidine.

5. The compound of claim 1, which is 2-[2-(2,6-dichlorophenyl)-acetyl]-1-isopropyl guanidine.

6. The compound of claim 1, which is 2-[2-(2,6-dichlorophenyl)-acetyl]-1,1-dimethyl guanidine.

7. The compound of claim 1, which is 2-[2-(2,6-dichlorophenyl)-acetyl]-1,3-dimethyl guanidine.

8. The compound of claim 1, which is 2-[2-(2,6-dichlorophenyl)-acetyl]-1-(3-hydroxypropyl)-guanidine.

References Cited

Chemical Abstracts, 49; 4879 g (1955), Caujolle et al.

NORMA S. MILESTONE, Primary Examiner

S. D. WINTERS, Assistant Examiner

U.S. Cl. X.R.

260—309.7, 256.4 N, H, 309.6, 564 A; 424—273, 251, 324

UNITED STATES PATENT OFFICE
CERTIFICATE OF CORRECTION

Patent No. 3,634,508   Dated January 11, 1972

Inventor(s) John B. Bream, Claude W. Picard

It is certified that error appears in the above-identified patent and that said Letters Patent are hereby corrected as shown below:

Column 3, delete line 67.

Signed and sealed this 3rd day of December 1974.

(SEAL)
Attest:

McCOY M. GIBSON JR.          C. MARSHALL DANN
Attesting Officer            Commissioner of Patents